US012736641B2

(12) United States Patent
Lee et al.

(10) Patent No.: US 12,736,641 B2
(45) Date of Patent: Sep. 15, 2026

(54) LIDAR NOISE REMOVAL APPARATUS AND METHOD THEREOF

(71) Applicants: Hyundai Motor Company, Seoul (KR); Kia Corporation, Seoul (KR)

(72) Inventors: Eun Sang Lee, Seongnam (KR); Yong Sung Lee, Seongnam (KR); Sang Gyu Park, Suwon (KR); Woo Il Lee, Uiwang (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 1162 days.

(21) Appl. No.: 17/528,467

(22) Filed: Nov. 17, 2021

(65) Prior Publication Data

US 2022/0276357 A1 Sep. 1, 2022

(30) Foreign Application Priority Data

Feb. 26, 2021 (KR) ........................ 10-2021-0026952

(51) Int. Cl.

*G01S 7/487* (2006.01)
*G01S 7/481* (2006.01)
*G01S 17/08* (2006.01)

(52) U.S. Cl.

CPC .......... *G01S 7/4876* (2013.01); *G01S 7/4817* (2013.01); *G01S 17/08* (2013.01)

(58) Field of Classification Search

CPC ...... G01S 7/4876; G01S 7/4817; G01S 17/08; G01S 7/48; G01S 13/00; G01S 15/00; G01S 17/00; G01S 7/4873; G01S 7/497; G01S 7/4911; G01S 7/4913; G01S 7/493; G01S 17/42; H03M 1/12

See application file for complete search history.

(56) References Cited

U.S. PATENT DOCUMENTS 8,279,420 B2 * 10/2012 Ludwig .................. G01S 17/36 356/3.01
10,088,559 B1 * 10/2018 Weed .................... G01S 7/4817
10,254,388 B2 * 4/2019 LaChapelle ............. G01S 7/497
11,255,968 B2 2/2022 Lee
2015/0041625 A1 2/2015 Dutton et al.

(Continued)

FOREIGN PATENT DOCUMENTS

EP 3540460 A1 9/2019
JP 2019-128221 A 8/2019

(Continued)

OTHER PUBLICATIONS

YOSHINA_JP-2019158693-A-PE2E Translated Copy—NOTE original copy included separately (listed above) (Year: 2019).*

(Continued)

*Primary Examiner* — Catherine T. Rastovski
*Assistant Examiner* — Toni D Sauncy
(74) *Attorney, Agent, or Firm* — Fox Rothschild LLP

(57) ABSTRACT

A lidar noise removal apparatus outputs an electrical signal corresponding to an input light signal and compares the electrical signal with a threshold voltage to detect an electrical signal greater than the threshold voltage. The apparatus variably adjusts the threshold voltage based on a result of comparing the number of receptions of the electrical signal detected through the comparative device with a preset first reference number of times.

16 Claims, 11 Drawing Sheets

(56) References Cited

U.S. PATENT DOCUMENTS

| | | | | |
|---|---|---|---|---|
| 2018/0284226 | A1* | 10/2018 | LaChapelle | G01S 17/10 |
| 2019/0064331 | A1* | 2/2019 | Russell | G01S 7/484 |
| 2019/0079167 | A1* | 3/2019 | Gaalema | G01S 7/489 |
| 2019/0101648 | A1 | 4/2019 | Lee | |
| 2019/0120925 | A1* | 4/2019 | Lohbihler | G01S 11/06 |
| 2019/0146071 | A1* | 5/2019 | Donovan | G01S 17/931 |
| 2019/0235052 | A1* | 8/2019 | LaChapelle | G01S 7/484 |
| 2019/0302246 | A1* | 10/2019 | Donovan | G01S 17/08 |
| 2019/0310351 | A1* | 10/2019 | Hughes | G02B 26/101 |
| 2020/0049821 | A1* | 2/2020 | LaChapelle | G01S 17/42 |
| 2020/0182985 | A1* | 6/2020 | Wu | G01S 17/14 |
| 2020/0200874 | A1* | 6/2020 | Donovan | G01S 17/931 |
| 2020/0300984 | A1 | 9/2020 | Matsuura et al. | |
| 2021/0043398 | A1* | 2/2021 | Lohbihler | G01S 11/02 |
| 2021/0072395 | A1 | 3/2021 | Yoshizawa et al. | |

FOREIGN PATENT DOCUMENTS

| | | | | |
|---|---|---|---|---|
| JP | 2019158693 | A * | 9/2019 | G01S 17/42 |
| KR | 10-1307274 | B1 | 9/2013 | |
| KR | 10-2019-0037884 | A | 4/2019 | |
| KR | 101978609 | B1 | 5/2019 | |
| KR | 20190127508 | A | 11/2019 | |
| WO | 2019-116641 | A1 | 6/2019 | |

OTHER PUBLICATIONS

Carrara, et al., "An Optical Interference Suppression Scheme for TCSPC Flash LiDAR Imagers", Appl. Sci. 2019, 9, 2206 (Year: 2019).*

Mcmanamon, et. al., "Comparison of flash lidar detector options", Optical Engineering 56(3), 031223, Mar. 2017 (Year: 2017).*

Williams, "Optimization of eyesafe avalanche photodiode lidar for automobile safety and autonomous navigation systems", Optical Engineering, vol. 56, Issue 3, 031224 Mar. 2017 (Year: 2017).*

Zhang, et. al., "A real-time noise filtering strategy for photon counting 3D imaging lidar", Optics Express, vol. 21, No. 8, Apr. 22, 2013 (Year: 2013).*

Dutton et al., "Multiple-Event Direct to Histogram TDC in 65nm FPGA Technology", ST Micro, University of Edinburgh, 1 2014.

* cited by examiner

Fig.1

| FRAME RATE | MAXIMUM DETECTION DISTANCE | HORIZONTAL FIELD OF VIEW | HORIZONTAL UNIT FIELD OF VIEW | DISTANCE DETECTION RESOLUTION | DISTANCE DETECTION ERROR RANGE |
|---|---|---|---|---|---|
| 25Hz | 300m | 120 DEGREES | 0.22DEGREES | 1cm | 10cm |

Fig.3

LIDAR NOISE REMOVAL APPARATUS AND METHOD THEREOF

CROSS-REFERENCE TO RELATED APPLICATION

This application claims the benefit of priority to Korean Patent Application No. 10-2021-0026952, filed in the Korean Intellectual Property Office on Feb. 26, 2021, the entire contents of which are incorporated herein by reference.

TECHNICAL FIELD

The present disclosure relates to a lidar noise removal apparatus and a method thereof, and more particularly, to lidar noise removal apparatus and a method thereof for a high-sensitivity light-receiving lidar of a motor scan type.

BACKGROUND

LiDAR is a sensor that transmits a laser and measures the time of an incoming laser reflected by a target to measure a distance. A motor scan type lidar needs to perform and complete operations such as signal reception, noise removal, and distance detection in a short time to detect the laser for a given time in response to the scanned field of view. In particular, a lidar including a high-sensitivity light-receiving sensor has very good sensitivity to a reflected incoming signal, but is also sensitive to a solar noise, thus causing the main cause of performance degradation if the noise is not accurately removed in a signal processor of a receiving end. To overcome this problem, the multi-light transmission algorithm is used in the lidar including the high-sensitivity light-receiving sensor. However, the motor scan type lidar has a limit of physical signal processing time, power consumption due to high-speed data processing and a problem of heat increase, when several hundreds of light transmissions are performed.

Accordingly, it is necessary to develop a technology that effectively removes a noise of a lidar including a high-sensitivity light-receiving sensor of a motor scan type without a multi light transmitting algorithm.

SUMMARY

The present disclosure has been made to solve the above-mentioned problems occurring in the prior art while advantages achieved by the prior art are maintained intact.

An aspect of the present disclosure provides a lidar noise removal apparatus for a motor scan type high-sensitivity light-receiving lidar and a method thereof. Another aspect of the present disclosure provides a lidar noise removal apparatus for removing a noise of a motor scan type high-sensitivity light-receiving lidar in a limited time and a method thereof. Still another aspect of the present disclosure provides a lidar noise removal apparatus for effectively removing a solar noise of a motor scan type high-sensitivity light-receiving lidar to which it is hard to apply a multi light transmitting algorithm due to a physical limitation of signal processing time and a method thereof.

Still another aspect of the present disclosure provides a lidar noise removal apparatus for effectively removing a noise by adjusting a threshold voltage differently depending on whether a target to be detected by a motor scan type high-sensitivity light-receiving lidar is a long-range target or a short-range target, and a method thereof. Still another aspect of the present disclosure provides a lidar noise removal apparatus for dynamically controlling a threshold voltage without applying a separate analog-digital converter (ADC), and effectively removing a noise while reducing the manufacturing cost of a lidar, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure a lidar noise removal apparatus may include a light receiving device which is provided in a lidar (light detection and ranging) to output an electrical signal corresponding to an input light signal, a comparative device configured to compare the electrical signal with a threshold voltage to detect an electrical signal greater than the threshold voltage, and a controller configured to variably adjust the threshold voltage based on a result of comparing a number of receptions of an electrical signal detected through the comparative device with a first reference number of times.

The first reference number of times may be set according to a minimum time between which distinguishment of signals is possible for signal processing of the electrical signals detected through the comparative device. The threshold voltage may have an initial value which is set to a value higher than a maximum output of an electrical signal that the light receiving device is able to output.

The controller may be configured to variably adjust the threshold voltage determined for each horizontal unit field of view of the lidar. The controller may be configured to step up or increase the threshold voltage when the number of receptions of the electrical signal detected through the comparative device is more than the first reference number of times, and step down or decrease the threshold voltage when the number of receptions of the electrical signal detected through the comparative device is less than the first reference number of times.

The lidar noise removal apparatus may further include a light transmitting device configured to output a light signal, and the controller may be configured to output the light signal through the light transmitting device when the threshold voltage is maintained. The controller may be configured to output the light signal a preset number of times through the light transmitting device, and detect a valid signal corresponding to a light signal which returns back by being reflected by a target by comparing electrical signals in rounds based on time information of electrical signals detected through the comparative device.

The number of times the controller outputs the light signal through the light transmitting device may be determined such that a value obtained by subtracting a value, obtained by multiplying a time corresponding to the maximum detection distance of the lidar and the number of times the light signal is output, from a time required to scan the horizontal unit field of view of the lidar is greater than a time required to process an operation on the electrical signal. The controller may be configured to determine, as the valid signal, an electrical signal in which a time corresponding to the electrical signal has a difference within a preset threshold time between rounds among the electrical signals detected through the comparative device. The threshold time may be determined according to a preset error range for a distance from the lidar to the target. The controller may be configured to variably adjust the threshold voltage based on a result of comparing the number of receptions of the electrical signal detected through the comparative device with a preset second reference number of times, when the lidar targets a short-range target.

According to an aspect of the present disclosure, a lidar noise removal apparatus include a light receiving device which is provided in a lidar to receive an electrical signal corresponding to an input light signal, a comparative device configured to compare the electrical signal with a threshold voltage to detect an electrical signal greater than the threshold voltage, and a controller configured to monitor a level of a noise through an analog-digital converter (ADC) based on the electrical signal output from the light receiving device, and variably adjust the threshold voltage based on the monitored level of the noise.

According to an aspect of the present disclosure, a lidar noise removal method may include outputting, by a light receiving device provided in a lidar, an electrical signal corresponding to an input light signal, comparing, by a comparative device, the electrical signal with a threshold voltage to detect an electrical signal greater than the threshold voltage, and variably adjusting, by a controller, the threshold voltage based on a result of comparing the number of receptions of the electrical signal detected through the comparative device with a preset first reference number of times.

The first reference number of times may be set according to a minimum time between which distinguishment of signals is possible for signal processing of the electrical signals detected through the comparative device. The threshold time has an initial value which is set to a value higher than a maximum output of an electrical signal that the light receiving device is able to output.

The variably adjusting of the threshold voltage may include variably adjusting, by the controller, the threshold voltage determined for each horizontal unit field of view of the lidar. The variably adjusting of the threshold voltage may include stepping up or increasing, by the controller, the threshold voltage when the number of receptions of the electrical signal detected through the comparative device is greater than the first reference number of times, and stepping down or decreasing, by the controller, the threshold voltage when the number of receptions of the electrical signal detected through the comparative device is less than the first reference number of times.

The lidar noise removal method may further comprising outputting, by the controller, a light signal a preset number of times through a light transmitting device, and detecting, by the controller, a valid signal corresponding to a light signal which returns back by being reflected by a target by comparing electrical signals in rounds based on time information of electrical signals detected through the comparative device. The detecting of the valid signal corresponding to the light signal returning back by being reflected by the target, may include determining, by the controller, as a valid signal, an electrical signal in which a time corresponding to the electrical signal has a difference within a preset threshold time between rounds among the electrical signals detected through the comparative device. The threshold time may be determined according to a preset error range for a distance from the lidar to the target.

BRIEF DESCRIPTION OF THE DRAWINGS

The above and other objects, features and advantages of the present disclosure will be more apparent from the following detailed description taken in conjunction with the accompanying drawings:

Figure 1:
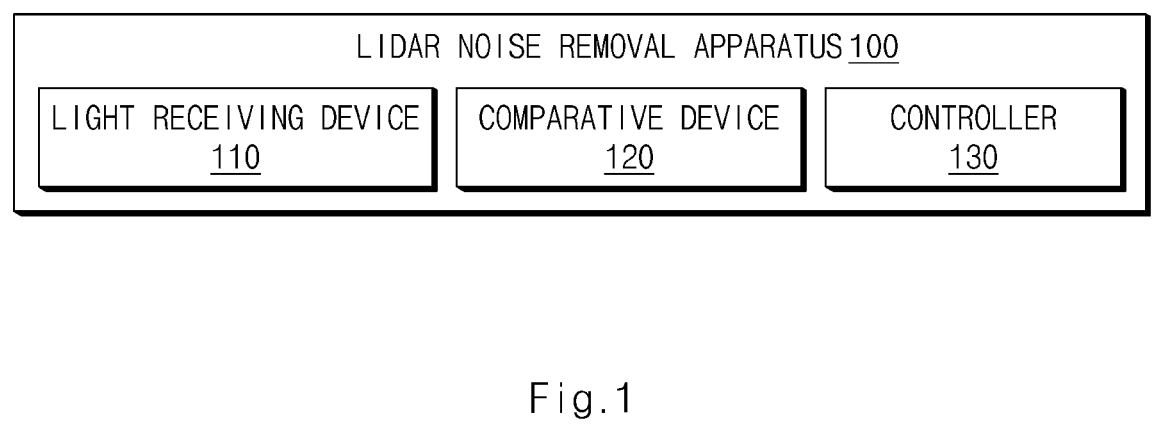

FIG. 1 is a block diagram showing a lidar noise removal apparatus according to an embodiment of the present disclosure;

FIG. 3 is a table exemplarily showing physical specifications of a motor scan type high-sensitivity light-receiving lidar.

DETAILED DESCRIPTION

Figure 2:
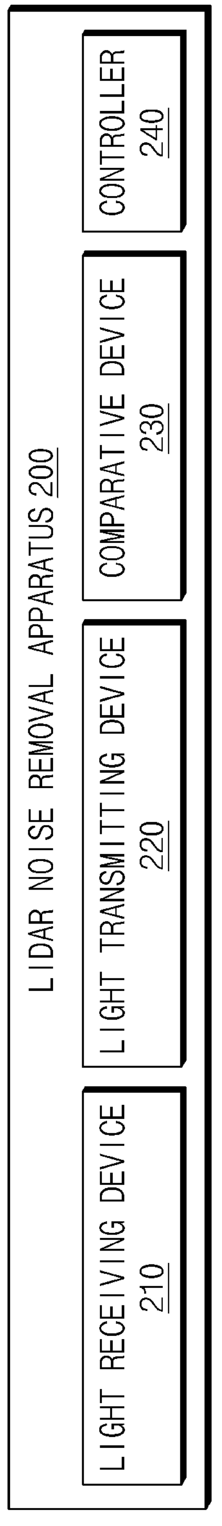
FIG. 2 is a block diagram showing a lidar noise removal apparatus according to another embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 11. FIG. 1 is a block diagram showing a lidar noise removal apparatus according to an embodiment of the present disclosure. Referring to FIG. 1, a lidar noise removal apparatus 100 may include a light receiving device 110, a comparative device 120, and a controller 130. The controller 130 may be configured to operate the light receiving device 110 and the comparative device 120.

The lidar noise removal apparatus 100 according to the present disclosure may be implemented inside or outside of a lidar (Light Detection And Ranging). In particular, the lidar noise removal apparatus 100 may be integrally formed with the internal controllers of the lidar, or may be implemented as a separate hardware device and connected to the controllers of the lidar through connection means. As an example, the lidar noise removal apparatus 100 may be implemented integrally with the lidar, may be implemented in a form that is installed/attached to the lidar as a configuration separate from the lidar, or some thereof may be integrated with the lidar, and some other parts may be implemented in a form that is installed/attached to the lidar as a configuration separate from the lidar.

The light receiving device 110 may be provided in the lidar to output an electrical signal corresponding to a light signal which is input. For example, the light receiving device 110 may include at least one or more of a light receiving sensor or an amplifier (AMP). For example, the light receiving sensor may include a silicon photo multiplier (SiPM). When a light signal is detected through a high-sensitivity light receiving sensor such as SiPM, even a single photon is detected, thus achieving a very good sensitivity compared to conventional sensors such as PD (Photo Diode) and APD (Avalanche Photo Diode).

However, when a light signal is detected through the high-sensitivity light receiving sensor, optical noise may be detected in addition to the reflected light reflected by a target required to detect the target due to the high sensitivity characteristic of the light receiving sensor. Accordingly, when the light signal is detected through the high-sensitivity light receiving sensor, the accuracy of target detection may be deteriorated, when a noise is not effectively removed, thus effective noise removal being essential For example, the light receiving device 110 may be directly or indirectly connected to the comparative device 120 via wireless or wired communication to transmit the output electrical signal.

The comparative device 120 may be configured to compare the electrical signal with a threshold voltage to detect an electrical signal greater than the threshold voltage. The comparative device 120 may include an analogue comparative device. For example, the comparative device 120 may be configured to detect an electrical signal greater than the threshold voltage by comparing an electrical signal output from the light receiving device 110 with the threshold voltage adjusted by the controller 130 through the comparative device.

As an example, the comparative device may be configured to output different result values corresponding to conditions: a condition that the electrical signal output from the light receiving device 110 is greater than the threshold voltage, a condition that the threshold voltage is greater than the electrical signal output from the light receiving device 110, and a condition that the electrical signal output from the light receiving device 110 is identical to the threshold voltage. For example, the comparative device 120 may be configured to transmit information about a detected electrical signal greater than the threshold voltage to the controller 130.

The controller 130 may be configured to perform overall control such that each of the components normally performs its function. The controller 130 may be implemented in the form of hardware or software, or may be implemented in a combination of hardware and software. Preferably, the controller 130 may be implemented with a microprocessor, but is not limited thereto In addition, the controller 130 may perform various data processing and computations, which will be described later. As an example, the controller 130 may include at least one or more of a firmware or a field programmable gate array (FPGA) of the lidar, which performs digital signal processing.

The controller 130 may be configured to variably adjust the threshold voltage based on a result of comparing the number of receptions of the electrical signal detected through the comparative device 120 with a preset first reference number of times. The threshold voltage needs to be dynamically controlled according to a given environment rather than a fixed value. The main purpose of adjusting the threshold voltage may be to perform a function of selecting only a valid signal greater than a specific signal level by automatically adjusting the threshold voltage according to an external environment in a multi-channel lidar system.

For example, the controller 130 may be configured to increase the threshold voltage when the number of receptions of the electrical signal detected by the comparative device 120 is greater than the first reference number of times, and decrease the threshold voltage when the number of receptions of the electrical signal detected by the comparative device 120 is less than the first reference number of times. For example, the controller 130 may be configured to transmit information on the controlled threshold voltage to the comparative device 120.

For example, the first reference number of times may be set according to the minimum time for which signals are able to be distinguished for signal processing of the electrical signal detected by the comparative device 120. Solar noise has an even level of output, and the farther the target is from the lidar, the lower the output level of the reflected light from the target. When the target is at a near distance, the output of the reflected light reflected by the target is relatively high compared to solar noise, so that the reflected light may be easily detected. However, when the target is at a far distance, the reflected light may be difficult to be distinguished from the noise, so that it is necessary to detect and analyze as many noise signals as possible.

However, for signal processing of the electrical signal, a minimum unit of time for distinguishing a previous signal from a next signal may be determined, and in consideration of this, it is necessary to detect a noise signal as many times as possible. For example, when the maximum detection distance of the lidar is about 300 m, the time it takes for the laser transmitted from the lidar to be reflected by the target located about 300 m from the lidar and return is calculated as about 2 μs, and it is assuming that a minimum time for which signals are able to be distinguished for signal processing is set to 16 ns, it is possible to detect a maximum of 125 signals by dividing 2 μs by 16 ns. Accordingly, in this case, the first reference number of times may be set to 125.

For example, the first reference number of times may be calculated and set through the controller 130, or may be set according to the specifications of a lidar when manufacturing the lidar. For example, an initial value of the threshold voltage may be set to a value greater than a maximum output of an electrical signal that may be output from the light receiving device 110. When the initial threshold voltage is set high, it is possible to create a condition in which no signal is initially detected.

For example, when the maximum output of an analogue front end (AFE) included in the light receiving device 110 is set to 1.5 V, and the maximum output of the electrical signal output from the light receiving device 110 is 1.5 V, the initial value of the threshold voltage may be set to 2V. For example, the first reference number of times may be set to have an initial value through the controller 130, or may be set according to the specifications of the lidar when manufacturing the lidar. For example, the controller 130 may be configured to variably adjust the threshold voltage determined for each horizontal unit view angle of the lidar.

When the lidar is a motor scan type, the lidar may be configured to detect a target while changing the horizontal field of view for detecting the target by the motor. In particular, light noise corresponding to different environments may be detected for each unit field of view in the horizontal direction, and therefore, it is necessary to dynamically control the threshold voltage for each horizontal unit field of view to detect a signal corresponding to the first reference number of times for each horizontal unit field of view.

Accordingly, when the field of view in the horizontal direction scanned using a motor by the lidar is changed, the controller 130 may be configured to dynamically adjust the threshold voltage determined for each horizontal unit field of view in a variable manner. For example, when the lidar targets a short-range target, the controller 130 may be configured to variably adjust the threshold voltage based on a result of comparing the number of receptions of the electrical signal detected through the comparative device 120 with a preset second reference number of times. As an example, the second reference number of times may be determined to be 1 or 2.

In the case of the LIDAR targeting a short-range target, the output of the electrical signal corresponding to the reflected light reflected by the short-range target may be relatively high compared to the light noise. Therefore, when the second reference number of times is set to 1, a signal detected first by stepping down or decreasing the threshold voltage from an initial threshold voltage at which no signal is detected may be a signal corresponding to the reflected light reflected by a target, which is a signal with the largest magnitude, making it easier to detect a reflected light signal.

When the second reference number of times is set to 2, a signal corresponding to the reflected light with the largest magnitude and a signal with the largest magnitude among the light noise may be detected, thus detecting the signal corresponding to the reflected light and also figuring out a signal level of the light noise. For example, the controller 130 may be configured to monitor a level of noise through an analog-digital converter (ADC) based on an electrical signal output from the light receiving device 110, and variably adjust a threshold voltage based on the monitored level of the noise.

For example, the controller 130 may be configured to convert an output of each channel of the light receiving device 110 into an ADC output to monitor a level of noise. For example, instead of variably adjusting the threshold voltage according to the number of times the detected signal is received, the controller 130 may be configured to variably adjust the threshold voltage according to the level of noise monitored through the ADC based on the electrical signal output from the light receiving device 110.

FIG. 2 is a block diagram showing a lidar noise removal apparatus according to another embodiment of the present disclosure. Referring to FIG. 2, a lidar noise removal apparatus 200 may include a light receiving device 210, a light transmitting device 220, a comparative device 230, and a controller 240.

The light receiving device 210 may be provided in the lidar to output an electrical signal corresponding to a light signal which is input. The light receiving device 210 is the same as the light receiving device 110 of FIG. 1, and therefore, a detailed description thereof will be omitted. The light transmitting device 220 may be provided in a lidar to output a light signal. For example, the light transmitting device 220 may be operated by the controller 240 and may be configured to output a laser (Light Amplification by Stimulated Emission of Radiation) light signal toward a target.

The light transmitting device 220 provided in a motor scan type lidar may be configured to output a light signal for each horizontal unit field of view. The comparative device 230 may compare the electrical signal with a threshold voltage to detect an electrical signal greater than the threshold voltage. The comparative device 230 is the same as the comparative device 120 of FIG. 1, and therefore a detailed description thereof will be omitted. When the threshold voltage is maintained, the controller 240 may be configured to output a light signal through the light transmitting device 220.

For example, the controller 240 may be configured to increase the threshold voltage when the number of receptions of the electrical signal detected by the comparative device 230 is greater than the first reference number of times, and decrease the threshold voltage when the number of receptions of the electrical signal detected by the comparative device 230 is less than the first reference number of times. In particular, when the number of receptions of the electrical signal detected through the comparative device 230 is equal to a first reference number of times, the threshold voltage is maintained without increasing or decreasing, and thus the controller 240 may be configured to output a light signal through the light transmitting device 220.

For example, the controller 240 may be configured to output the light signal through the light transmitting device 220 a preset number of times or more, and compare the electrical signals multiple times based on time information of the electrical signals detected through the comparative device 230 to detect a valid signal corresponding to the light signal which returns back by being reflected by the target. For example, the preset number of times may be set to three times. For example, the controller 240 may be configured to transmit and receive light three times through the light transmitting device 220 and the light receiving device 210 such that the reflected light signal reflected by the target are able to be distinguished for each horizontal unit field of view.

For example, the controller 240 may be configured to require at least three pieces of received data to determine the validity of the received signal, and thus transmit and receive light three times or more. In addition, the controller 240 may be configured to output a light signal through the light transmitting device 220 a predetermined number of times in consideration of a time limited for each horizontal unit field of view according to the maximum detection distance of the lidar. For example, the number of times the controller 240 outputs the light signal through the light transmitting device 220 may be determined such that a value obtained by subtracting a value, obtained by multiplying a time corresponding to the maximum detection distance of the lidar and the number of times the light signal is output, from a time required to scan the horizontal unit field of view of the lidar is greater than a time required to process an operation on the electrical signal.

For example, when the maximum detection distance of the lidar is set to 300 m and the time required to scan the horizontal unit field of view of the lidar is set to 12.2 μs, a time required for a laser transmitted from the lidar to be reflected by a target located 300 m from the lidar and return is calculated as 2 μs, when the light signal is transmitted and received three times, the remaining time is calculated as in 12.2 μs−(2 μs*3)=6.2 μs. If the operation related to the electrical signal is capable of being processed for 6.2 vs, the controller 240 may be configured to set the number of times the light signal is output through the light transmitting device 220 to three times.

As an example, the controller 240 may be configured to determine, as a valid signal, an electrical signal in which a time corresponding to each electrical signal has a difference within a preset threshold time between rounds among electrical signals detected through the comparative device 230. Operation of detecting a valid signal by comparing the signals acquired according to the transmission and reception of light signals three times in the controller 240 will be described in detail later with reference to FIG. 8.

For example, the threshold time may be determined according to a preset error range with respect to a distance from the lidar to a target. For example, when the error range of the lidar is set to 10 cm, the time for the light signal to travel 10 cm is 670 ps. In particular, an electrical signal having a difference in time corresponding to an electrical signal between rounds which is less than 670 ps may be determined as a valid signal corresponding to a reflected light reflected by a target.

FIG. 3 is a table exemplarily showing physical specifications of a motor scan type high-sensitivity light-receiving lidar. The frame rate of a lidar may refer to a round in which an output of the lidar is updated per second. For example, the frame rate of the lidar may be set to 25 Hz. The maximum detection distance of the lidar may refer to the maximum distance from the lidar to a target which the lidar is able to detect. For example, the maximum detection distance of the lidar may be set to 300 m.

The horizontal field of view of the lidar may be an angular region in which a target is able to be detected, as a horizontal region of regions in which the motor of the lidar rotates. For example, the horizontal field of view of the lidar may be set to 120 degrees. The horizontal unit field of view of the lidar may be an angle at which a target is able to be detected specifically within the horizontal field of view. For example, the horizontal unit field of view of the lidar may be set to 0.22 degrees.

The distance detection resolution of the lidar may refer to a unit for expressing the distance value of the target specifically. For example, the distance detection resolution of the lidar may be set to 1 cm. The distance detection error range of the lidar may refer to an error range generated when expressing the distance value of the target. For example, the distance detection error range of the lidar may be set to 10 cm.

Particularly, as an example, the frame rate of the lidar, the maximum detection distance of the lidar, the horizontal field of view of the lidar, the horizontal unit field of view of the lidar, the distance detection resolution of the lidar, or the distance detection error range of the lidar may actually have a different value depending on the specifications of the lidar. The information on the specifications of the lidar may be included in the lidar noise removal apparatus 100 or stored in a memory connected to the lidar noise removal apparatus 100 and thus, the lidar noise removal apparatus 100 may use the information on the specifications of the lidar.

Figure 4:
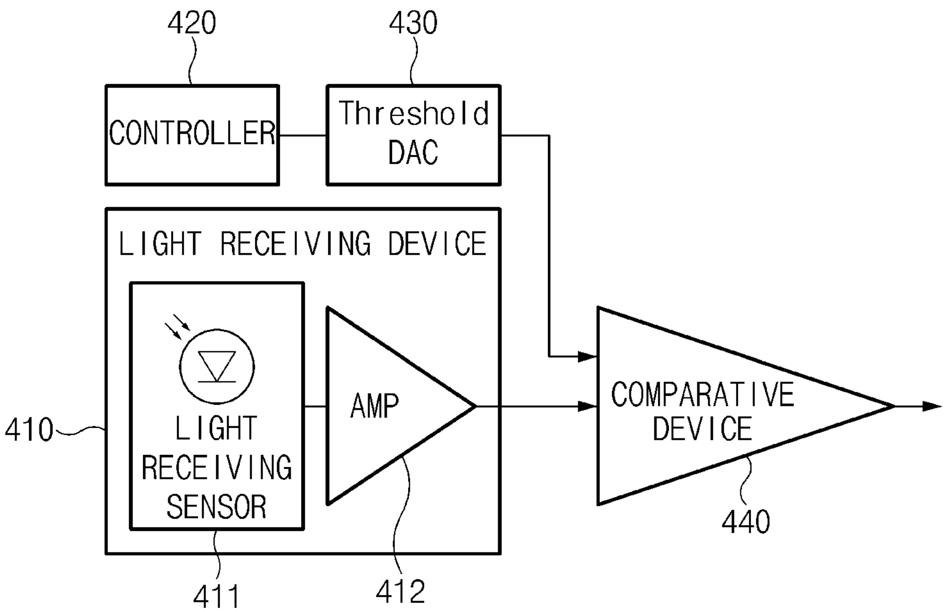
FIG. 4 is a diagram illustrating a circuit related to threshold voltage control according to an embodiment of the present disclosure.

FIG. 4 is a diagram illustrating a circuit related to threshold voltage control according to an embodiment of the present disclosure. For example, a light receiving device 410 may include a light receiving sensor 411 and an AMP 412. The light receiving device 410 may be configured to convert an input optical signal into an electrical signal through the light receiving sensor 411. In addition, the light receiving device 410 may be configured to amplify an electrical signal resulted from conversion to an electrical signal of an appropriate scale through the AMP 412. The light receiving device 410 may be configured to transfer the electrical signal which is amplified through the AMP 412 to a comparative device 440.

A controller 420 may be connected to a threshold DAC 430 (Threshold Digital-Analogue Converter) to transmit information on a threshold voltage to the threshold DAC 430. The threshold DAC 430 may be configured to output an electrical signal based on the threshold voltage received from the controller 420, and may be configured to transfer the output electrical signal to the comparative device 440. The comparative device 440 may include one or more comparative devices. The comparative device 440 may be configured to compare the electrical signal received from the light receiving device 410 with an electrical signal corresponding to the threshold voltage received from the threshold DAC 430, and output a comparison result.

For example, the comparative device 440 may be configured to transmit a result of comparing the electrical signal received from the light receiving device 410 with the electrical signal corresponding to the threshold voltage received from the threshold DAC 430 to the controller 420. In particular, the controller 420 may be configured to perform variable control to increase, decrease or maintain a threshold voltage based on a result, which is transferred by the comparative device 440, of comparing the electrical signal received from the light receiving device 410 with the electrical signal corresponding to the threshold voltage received from the threshold DAC 430.

Figure 5:
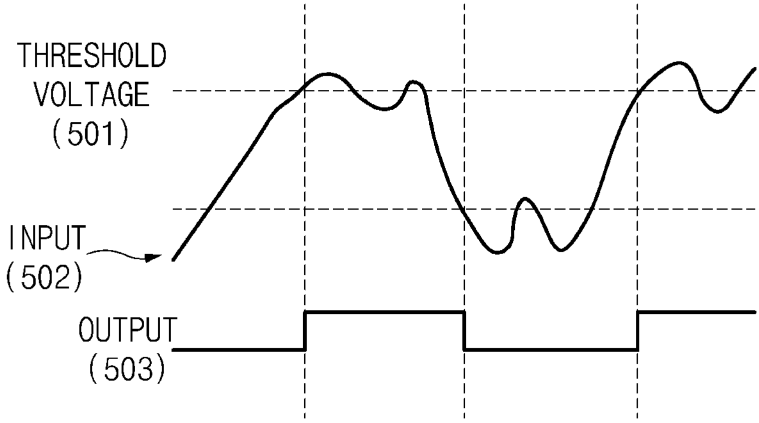
FIG. 5 is a diagram illustrating waveforms and threshold voltages of a comparative device according to an embodiment of the present disclosure.

FIG. 5 is a diagram illustrating waveforms and threshold voltages of a comparative device according to an embodiment of the present disclosure. Referring to FIG. 5, the comparative device 120 may be configured to receive a threshold voltage 501 and an input electrical signal 502. For example, the comparative device 120 may be configured to receive an electrical signal corresponding to the threshold voltage 501 from the controller 130, and receive the input electrical signal 502 corresponding to an optical signal from the light receiving device 110.

The comparative device 120 may be configured to output a result value 503 resulted from comparison of the threshold voltage 501 and the input electrical signal 502. For example, the comparative device 120 may be configured to output a low signal when the threshold voltage 501 is greater than the input electrical signal 502, and a high signal when the input electrical signal 502 is greater than the threshold voltage 501.

Contrary to the above case, the comparative device 120 may be configured to output a high signal when the threshold voltage 501 is greater than the input electrical signal 502, and a low signal when the input electrical signal 502 is greater than the threshold voltage 501. As another example, the comparative device 120 may be configured to output a high signal from a point in time when the input electrical signal 502 becomes greater than a first threshold voltage, and output a low signal from a point in time when the input electrical signal 502 becomes less than a second threshold voltage. In particular, the first threshold voltage may be set to be greater than the second threshold voltage. For example, the comparative device 120 may be configured to transfer information on the result value 503 resulted from comparison of the output threshold voltage 501 with the input electrical signal 502 to the controller 130.

Figure 6:
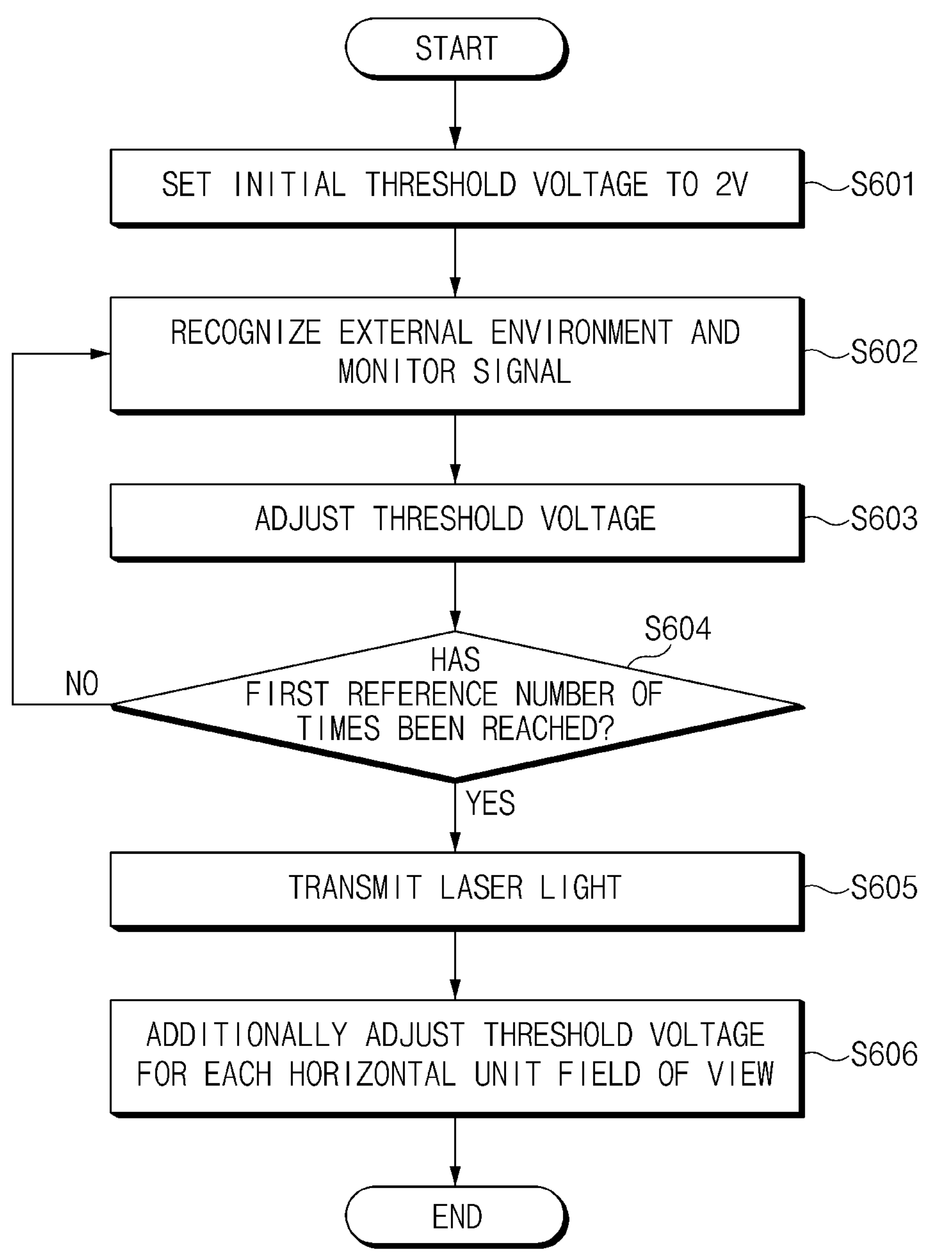
FIG. 6 is a flowchart of a process of variably controlling a threshold voltage in a lidar noise removal apparatus according to an embodiment of the present disclosure.

FIG. 6 is a flowchart of a process of variably adjusting a threshold voltage in a lidar noise removal apparatus according to an embodiment of the present disclosure. Hereinafter, it is assumed that the lidar noise removal apparatus 100 of FIG. 1 performs the process of FIG. 6. In addition, in the description of FIG. 6, an operation described as being performed by the apparatus may be understood as being operated by the controller 130 of the lidar noise removal apparatus 100.

Referring to FIG. 6, the lidar noise removal apparatus 100 may be configured to set an initial threshold voltage to 2V (S601). In particular, the numerical value of 2V is an arbitrarily determined value for the sake of example, and in reality, the initial threshold voltage may be determined as another value greater than the maximum output of an electrical signal that the light receiving device is capable of outputting.

After setting the initial threshold voltage to 2V (S601), the lidar noise removal apparatus 100 may be configured to recognize an external environment and monitor a signal (S602). As an example, the lidar noise removal apparatus 100 may be configured to detect a noise (optical noise) according to the external environment through a light receiving device, and monitor an electrical signal corresponding to the noise. As an example, the lidar noise removal apparatus 100 may be configured to detect an electrical signal having a magnitude greater than the threshold voltage among electrical signals corresponding to an external noise. In addition, the lidar noise removal apparatus 100 may be configured to monitor the number of times of receptions of an electrical signal having a magnitude greater than the threshold voltage.

After recognizing the external environment and monitoring the signal (S602), the lidar noise removal apparatus 100 may be configured to adjust the threshold voltage (S603). For example, the lidar noise removal apparatus 100 may be configured to increase the threshold voltage when the number of receptions of the electrical signal having the magnitude greater than the threshold voltage is greater than a first reference number of times, and decrease the threshold voltage when the number of receptions of the electrical signal having the magnitude greater than the threshold voltage is less than the first reference number of times.

After adjusting the threshold voltage (S603), the lidar noise removal apparatus 100 may be configured to determine whether the number of receptions of the detected electrical signal reaches the first reference number of times (S604). As an example, the lidar noise removal apparatus 100 may be configured to determine whether the first reference number of times determined in consideration of a dead time is equal to the number of receptions of the detected electrical signal with a magnitude greater than the threshold voltage. In particular, the dead time may be defined as a minimum time unit for discriminating a previous signal and a next signal for signal processing.

As another example, even though the first reference number of times determined in consideration of the dead time is not equal to the number of receptions of the detected electrical signal with a magnitude greater than the threshold voltage, the lidar noise removal apparatus 100 may be configured to determine whether the first reference number of times is within a range in which the first reference number of times is considered as being reached since a difference between the number of receptions of the detected electrical signal with a magnitude greater than the threshold voltage and the first reference number of times is less than a threshold.

After determining whether the number of receptions of the detected electrical signal has reached the first reference number of times (S604), the lidar noise removal apparatus 100 may return to S602 to again recognize the external environment and monitor the signal in response to determining that the number of receptions of the detected electrical signal does not reach the first reference number of times. After determining whether the number of receptions of the detected electrical signal has reached the first reference number of times (S604), the lidar noise removal apparatus 100 may be configured to transmit a laser in response to determining that the number of receptions of the detected electrical signal has reached the first reference number of times (S605).

For example, the lidar noise removal apparatus 100 may be configured to transmit a laser light signal in a horizontal unit field of view direction toward which the lidar is directed through the light transmitting device, and receive a light signal including a reflected light reflected by a target in the horizontal unit field of view direction. After transmitting the laser (S605), the lidar noise removal apparatus 100 may be configured to additionally adjust the threshold voltage for each horizontal unit field of view (S606). For example, when the horizontal field of view toward which the lidar is directed is changed by the motor of the lidar, the lidar noise removal apparatus 100 may be configured to variably adjust the threshold voltage for a new horizontal unit field of view according to a new external environment. For example, a process of variably controlling the threshold voltage for the new horizontal unit field of view according to the new external environment in the lidar noise removal apparatus 100 may be performed in the same manner as in S601 to S604.

Figure 7:
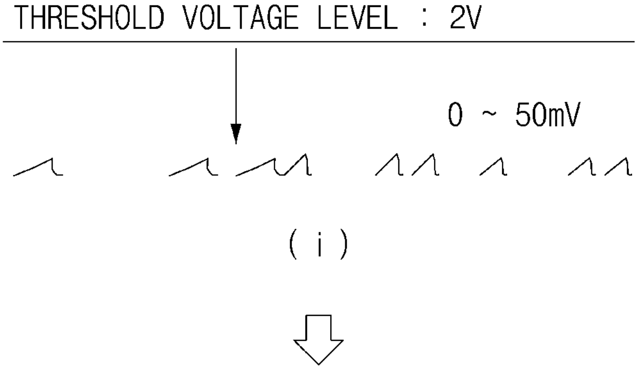
FIG. 7 is a diagram illustrating a threshold voltage that is variably controlled by a lidar noise removal apparatus and a noise according to an embodiment of the present disclosure.
Figure 7:
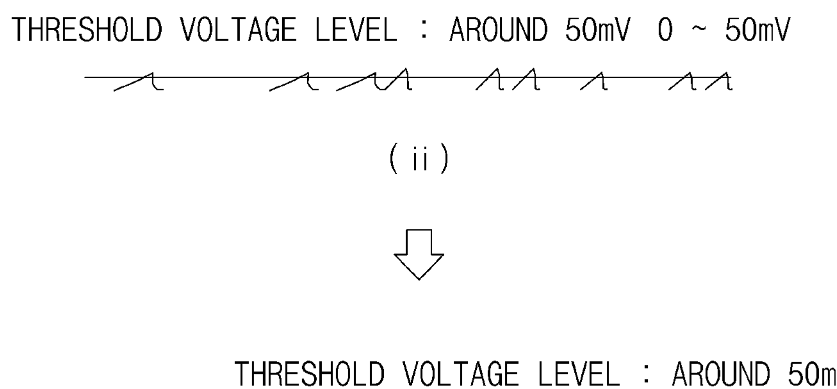
Figure 7:
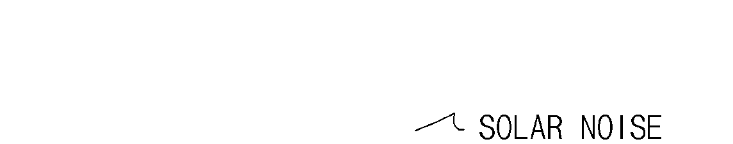

FIG. 7 is a diagram illustrating a threshold voltage that is variably adjusted by a lidar noise removal apparatus and a noise according to an embodiment of the present disclosure. In graphs (i) to (iii) of FIG. 7, the horizontal axis may represent time, and the vertical axis may represent the strength (voltage) of an electrical signal.

In FIG. 7, (i) is a graph illustrating an electrical signal corresponding to solar noise detected in a state where an initial threshold voltage is set to 2V when the lidar noise removal apparatus 100 does not transmit a laser beam. The lidar noise removal apparatus 100 may be configured to decrease a threshold voltage since the number of receptions of the electrical signal greater than the threshold voltage is less than the first reference number of times when there is few electrical signal having a signal magnitude greater than the threshold voltage in a state where the initial threshold voltage is set to 2V. In particular, as a specific example, an electrical signal corresponding to solar noise may be mainly distributed in a range of 0-50 mV in a state where an external illuminance is 30 klux.

In FIG. 7, (ii) is a graph illustrating an electrical signal corresponding to solar noise detected in a state in which the lidar noise removal apparatus 100 variably adjusts the threshold voltage to be near 50 mV. The lidar noise removal apparatus 100 may be configured to variably adjust the threshold voltage to be around 50 mV such that the number of receptions of an electrical signal having a signal magnitude greater than the threshold voltage is equal to the first reference number of times. The lidar noise removal apparatus 100 may be configured to maintain the threshold voltage as it is when the number of receptions of the electrical signal having a signal magnitude greater than the threshold voltage is equal to the first reference number of times.

In FIG. 7, (iii) is a graph illustrating detected solar noise and an electrical signal corresponding to a reflected light reflected by a target when the lidar noise removal apparatus 100 transmits a laser while maintaining the threshold voltage. The lidar noise removal apparatus 100 may be configured to transmit a laser light signal through the light transmitting device in a state where the threshold voltage is maintained as it is, output an electrical signal corresponding to the light signal including a reflected light that returns back by being reflected by the target and a solar noise, and detect an electrical signal greater than the threshold voltage among the output electrical signals. As an example, the lidar noise removal apparatus 100 may be configured to remove the solar noise based on the electrical signal greater than the threshold voltage among the electrical signals output according to light transmission and reception of three or more times and select a valid signal.

Figure 8:
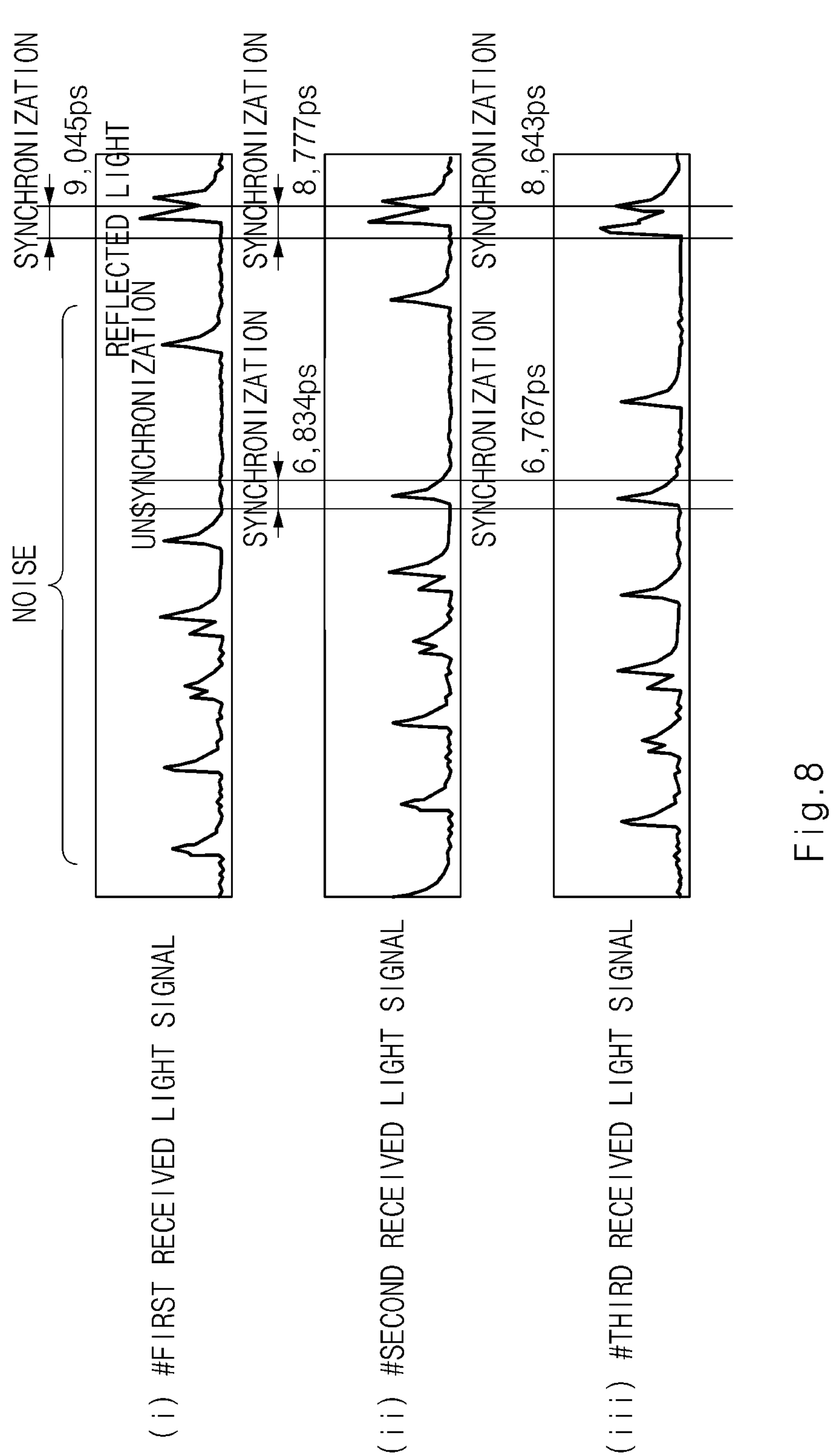
FIG. 8 is a diagram illustrating an operation of detecting a valid signal by comparing signals obtained according to light transmission and reception of three times in a lidar noise removal apparatus according to an embodiment of the present disclosure.

FIG. 8 is a diagram illustrating an operation of detecting a valid signal by comparing signals obtained according to light transmission and reception of three times in a lidar noise removal apparatus according to an embodiment of the present disclosure. When signals passing through the comparative device are analyzed after the light transmission/reception of three times, the solar noise has a characteristic of being randomly distributed in all time domains, so that probability that a signal corresponding to the solar noise is detected at the same position in electrical signals corresponding to light signals received three times is very low.

On the other hand, since the time until the reflected light that returns back by being reflected by the target after transmission of light is constant, the probability that the electrical signal corresponding to the reflected light is detected at the same location is very high. Using the above-described characteristics, the lidar noise removal apparatus 100 may be configured to determine whether the electrical signals are time synchronized by comparing times of the electrical signals corresponding to the light signals received three times.

In FIG. 8, (i) to (iii) are graphs showing examples of electrical signals corresponding to received light signals of first to third times. The lidar noise removal apparatus 100 may be configured to detect a synchronized electrical signal by comparing an electrical signal corresponding to a received light signal of a first round with an electrical signal corresponding to a received light signal of a second round, detect a synchronized electrical signal by comparing the electrical signal corresponding to the received light signal of the second round with an electrical signal corresponding to a received light signal of a third round, and detect a synchronized electrical signal by comparing the electrical signal corresponding to the received light signal of the third round with the electrical signal corresponding to the received light signal of the first round.

For example, the lidar noise removal apparatus 100 may be configured to determine a signal having a difference smaller than 670 ps, which is a time corresponding to 10 cm, which is an error range of the lidar, as a synchronized signal. For example, when comparing the signal of the first round with the signal of the second round, the lidar noise removal apparatus 100 may be configured to determine, as synchronized signals, the signals of the first round and the second round because a difference between a signal detected at a time of 9,045 ps in the first round and a signal detected at a time of 8,777 ps in the second round is less than 670 ps.

In addition, when comparing the signal of the second round with the signal of the third round, the lidar noise removal apparatus 100 may be configured to determine, as synchronized signals, the signals of the second round and the third round because a difference between a signal detected at a time of 8,777 ps in the second round and a signal detected at a time of 8,643 ps in the third round is less than 670 ps.

Similarly, when comparing the signal of the third round with the signal of the first round, the lidar noise removal apparatus 100 may be configured to determine, as synchronized signals, the signals of the third round and the first round since a difference between a signal detected at a time of 8,643 ps in the third round and a signal detected at a time of 9,045 ps in the first round is less than 670 ps. Therefore, the signal corresponding to the reflected light reflected by the target is detected at a time of 9,045 ps in the first round, is detected at a time of 8,777 ps in the second round, and is detected at a time of 8,643 ps in the third round, and therefore, the signals are synchronized.

On the other hand, the signal detected at the time of 6,834 ps in the second round and the signal detected at the time of 6,767 ps in the third round may be determined to be synchronized when comparing the signals of the second and third rounds. However, there is no synchronized signal in the first round, and the signal in the first round is not determined as reflected light, thus removing the signal due to determination that the signal is noise.

Figure 9:
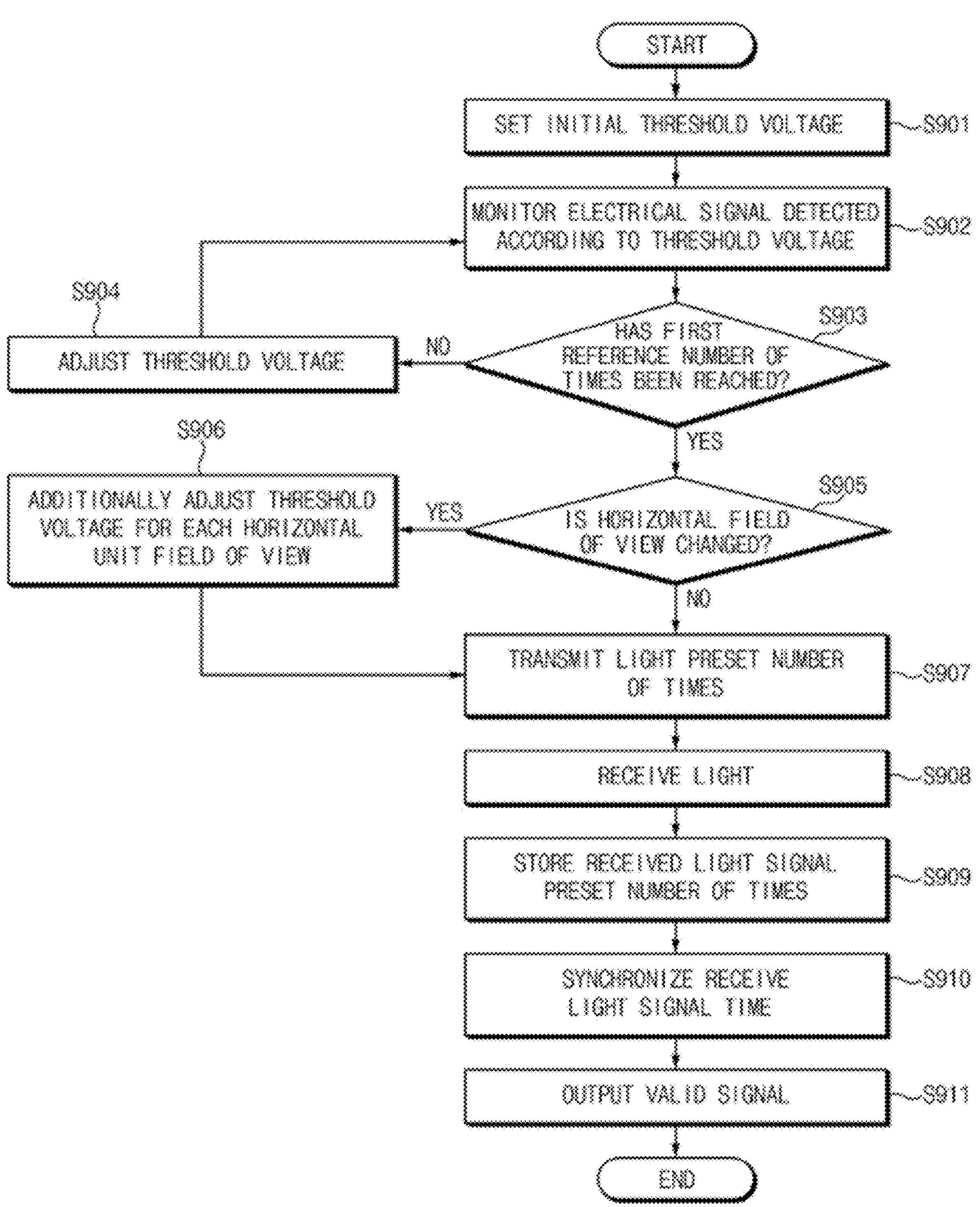
FIG. 9 is a flowchart of a lidar noise removal method according to an embodiment of the present disclosure.

FIG. 9 is a flowchart of a lidar noise removal method according to an embodiment of the present disclosure. Hereinafter, it is assumed that the lidar noise removal apparatus 100 of FIG. 1 performs the process of FIG. 9. In addition, in the description of FIG. 9, an operation described as being performed by the apparatus may be understood as being operated by the controller 130 of the lidar noise removal apparatus 100.

Referring to FIG. 9, the lidar noise removal apparatus 100 may be configured to set an initial value of a threshold voltage (S901). For example, the lidar noise removal apparatus 100 may be configured to set the initial value of the threshold voltage to a value greater than the maximum output of an electrical signal output from a light receiving device. After setting the initial value of the threshold voltage (S901), the lidar noise removal apparatus 100 may be configured to monitor an electrical signal detected according to the threshold voltage (S902).

As an example, the lidar noise removal apparatus 100 may be configured to monitor the number of receptions of an electrical signal having an output greater than a threshold voltage. After monitoring the electrical signal detected according to the threshold voltage (S902), the lidar noise removal apparatus 100 may be configured to determine whether the number of receptions of the electrical signal detected according to the threshold voltage has reached the first reference number of times (S903). For example, the lidar noise removal apparatus 100 may be configured to determine whether the number of receptions of the electrical signal having an output greater than the threshold voltage is equal to the first reference number of times or whether a difference between the number of receptions of the electrical signal having an output greater than the threshold voltage and the first reference number of times is smaller than a threshold value.

After determining whether the number of receptions of the electrical signal detected based on the threshold voltage has reached the first reference number of times (S903), the lidar noise removal apparatus 100 may be configured to adjust the threshold voltage in response to determining that the number of receptions of the electrical signal detected according to the threshold voltage has not reached the first reference number of times (S904). For example, the lidar noise removal apparatus 100 may be configured to increase the threshold voltage when the number of receptions of the electrical signal detected according to the threshold voltage is greater than the first reference number of times, and decrease the threshold voltage when the number of receptions of the electrical signal detected according to the threshold voltage is less than the first reference number of times.

After determining whether the number of receptions of the electrical signal detected based on the threshold voltage has reached the first reference number of times (S903), the lidar noise removal apparatus 100 may be configured to determine whether a horizontal field of view is changed in response to determining that the number of receptions of the electrical signal detected according to the threshold voltage has reached the first reference number of times (S905). As an example, the lidar noise removal apparatus 100 may be configured to determine whether the horizontal field of view of the lidar is greater than the horizontal unit field of view through a motor that adjusts the field of view of the lidar in the horizontal direction.

After determining whether the horizontal field of view has been changed (S905), the lidar noise removal apparatus 100 may be configured to additionally adjust the threshold voltage for each horizontal unit field of view in response to determining that the horizontal field of view has been changed (S906). As an example, in response to determining that the horizontal field of view has been changed larger than the horizontal unit field of view, the lidar noise removal apparatus 100 may be configured to variably adjust the threshold voltage for the new horizontal unit field of view in the same manner as in S901 to S904.

The lidar noise removal apparatus 100 may be configured to additionally adjust the threshold voltage for each horizontal unit field of view (S906), and then transmit a light signal a preset number of times (S907). After determining whether the horizontal field of view has been changed (S905), the lidar noise removal apparatus 100 may be configured to transmit the light signal the preset number of times in response to determining that the horizontal field of view is not changed (S907). As an example, the lidar noise removal apparatus 100 may be configured to transmit a laser light signal three times in the direction of the field of view of the lidar through the light transmitting device.

After transmitting the light signal the preset number of times (S907), the lidar noise removal apparatus 100 may be configured to receive the light signal (S908). As an example, the lidar noise removal apparatus 100 may be configured to receive, through a light receiving device, a light signal including a reflected light which returns back such a manner that the laser light signal transmitted is reflected by a target, and a solar noise. After receiving the light signal (S908), the lidar noise removal apparatus 100 may be configured to store the received light signal a preset number of times (S909). For example, the lidar noise removal apparatus 100 may be configured to store, in a memory, electrical signals corresponding to light signals received three times.

After storing the light signals received the preset number of times (S909), the lidar noise removal apparatus 100 may be configured to synchronize the time of the received light signals (S910). For example, the lidar noise removal apparatus 100 may be configured to compare the three received light signals stored with one another and synchronize the received light signals according to determination of whether a time corresponding to each electrical signal has a difference within a preset threshold time between rounds. After synchronizing the times of the received light signals (S910), the lidar noise removal apparatus 100 may be configured to output a valid signal (S911). As an example, the lidar noise removal apparatus 100 may be configured to determine, as a valid signal, an electrical signal in which a time corresponding to the electrical signal has a difference within a preset threshold time between rounds and output the electrical signal.

Figure 10:
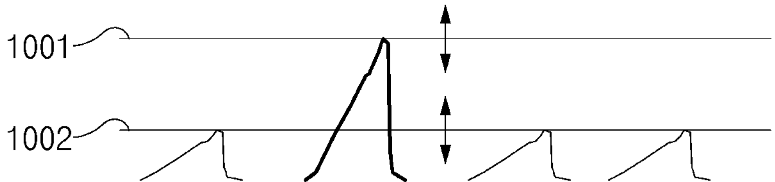
FIG. 10 is a diagram illustrating a threshold voltage that is variably controlled by a lidar noise removal apparatus that targets a short-range target according to an embodiment of the present disclosure and a noise.
Figure 10:
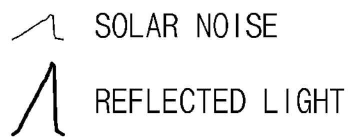

FIG. 10 is a diagram illustrating a threshold voltage that is variably adjusted by a lidar noise removal apparatus that targets a short-range target according to an embodiment of the present disclosure and a noise. For example, the lidar noise removal apparatus 100 targeting a short-range target may be configured to variably adjust a threshold voltage based on a result of comparing the number of receptions of a detected electrical signal with a preset second reference number of times.

Referring to FIG. 10, there are shown a threshold voltage 1001 at which the number of receptions of an electrical signal having an output greater than the threshold voltage is equal to the second reference number of times when a second reference number of times is 1, and a threshold voltage 1002 at which the number of receptions of an electrical signal having an output greater than the threshold voltage is equal to the second reference number of times when the second reference number of times is 2, in the lidar noise removal apparatus 100.

For example, in the case of the lidar noise removal apparatus 100, when a lidar targets a short-range target, the magnitude of an electrical signal corresponding to a reflected light reflected by the target is relatively greater than that of an electrical signal corresponding to a solar noise. Thus, when the second reference number of times is 1, only an electrical signal corresponding to the reflected light may be detected as an electrical signal having an output greater than the threshold voltage, and the remaining noise may be removed. For example, when the second reference number of times is 2, an electrical signal having the greatest output level among an electrical signal corresponding to reflected light and an electrical signal corresponding to a solar noise may be detected as an electrical signal having an output greater than the threshold voltage, and the remaining noise may be removed, identifying an output level of the noise.

Figure 11:
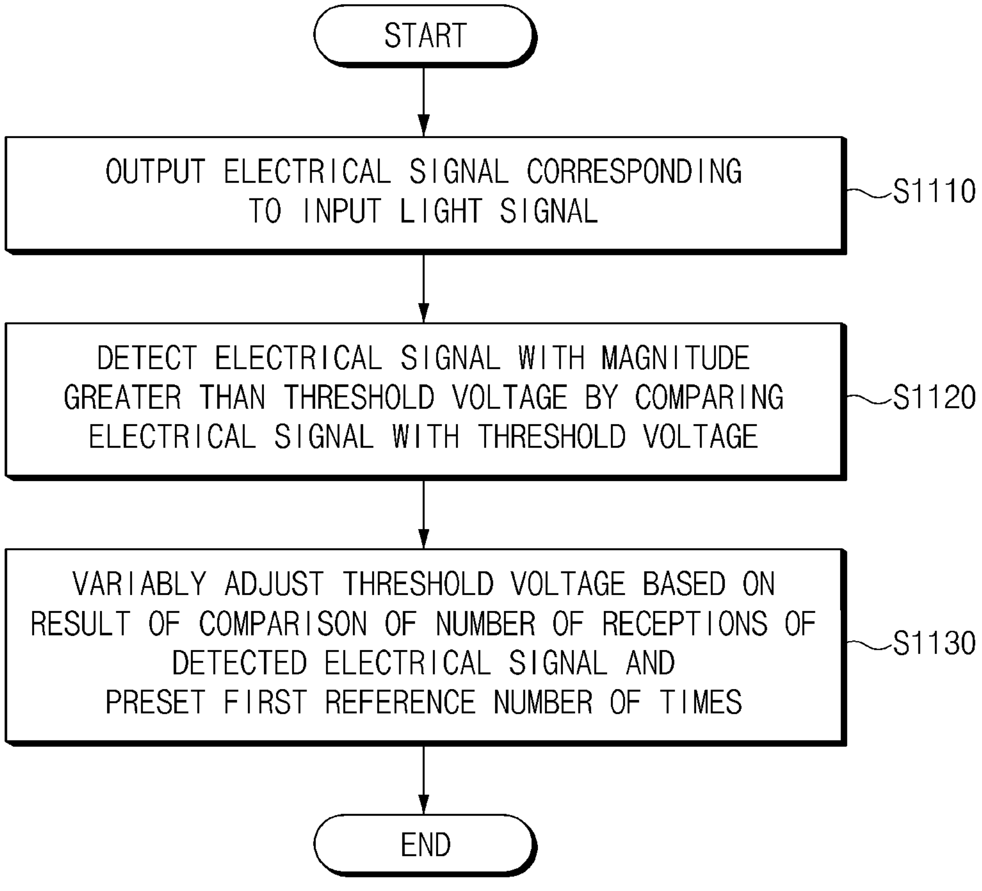
FIG. 11 is a flowchart illustrating a method for removing lidar noise according to another embodiment of the present disclosure.

FIG. 11 is a flowchart illustrating a method for removing lidar noise according to another embodiment of the present disclosure. Referring to FIG. 11, a lidar noise removal method may include outputting an electrical signal corresponding to an input light signal (S1110), detecting an electrical signal greater than a threshold voltage by comparing the electrical signal with the threshold voltage (S1120) and variably controlling the threshold voltage based on a result of comparing a number of receptions of the detected electrical signal with a preset first reference number of times (S1130).

The outputting of the electrical signal corresponding to the input light signal (S1110) may be performed through a light receiving device. The detecting of the electrical signal greater than the threshold voltage by comparing the electrical signal with the threshold voltage (S1120) may be performed by a comparative device. The variably adjusting of the threshold voltage based on the result of comparing the number of receptions of the detected electrical signal with the preset first reference number of times (S1130) may be performed through a controller, and may include variably adjusting the threshold voltage determined for each horizontal unit field of view of a lidar.

As an example, the variably adjusting of the threshold voltage based on the result of comparing the number of receptions of the detected electrical signal with the preset first reference number of times (S1130) may include increasing the threshold voltage when the number of receptions of the electrical signal detected through the comparative device is greater than the first reference number of times and decreasing the threshold voltage when the number of receptions of the electrical signal detected through the comparative device is less than the first reference number of times.

As an example, the lidar noise removal method may further include outputting a light signal through a light transmitting device a preset number of times or more and detecting a valid signal corresponding to a light signal which returns back by being reflected by a target by comparing electrical signals in rounds based on time information of electrical signals detected through the comparative device. For example, the detecting of the valid signal corresponding to the light signal which returns back by being reflected by a target may include determining as the valid signal, an electrical signal in which a time corresponding to an electrical signal of the electrical signals detected through the comparative device has a difference within a preset threshold time between rounds.

The operations of the method or the algorithm described in connection with the embodiments disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The effect of the apparatus and method for removing lidar noise according to the present disclosure will be described as follows.

According to at least one of the embodiments of the present disclosure, it is possible to provide a lidar noise removal apparatus for a high-sensitivity light-receiving lidar of a motor scan type and a method thereof. In addition, according to at least one of the embodiments of the present disclosure, it is possible to provide a lidar noise removal apparatus for removing a noise of a motor scan type high-sensitivity light-receiving lidar in a limited time and a method thereof.

In addition, according to at least one of the embodiments of the present disclosure, it is possible to provide a lidar noise removal apparatus for effectively removing a solar noise of a motor scan type high-sensitivity light-receiving lidar to which it is hard to apply a multi light transmitting algorithm due to a physical limitation of signal processing time.

In addition, according to at least one of the embodiments of the present disclosure, it is possible to provide a lidar noise removal apparatus for effectively removing a noise by adjusting a threshold voltage differently depending on whether a target to be detected by a motor scan type high-sensitivity light-receiving lidar is a long-range target or a short-range target, and a method thereof.

In addition, according to at least one of the embodiments of the present disclosure, it is possible to provide a lidar noise removal apparatus for dynamically controlling a threshold voltage without applying a separate analog-digital converter (ADC), and effectively removing a noise while reducing the manufacturing cost of a lidar, and a method thereof. In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lidar noise removal apparatus, comprising:

a light receiving device provided in a lidar to output an electrical signal corresponding to an input light signal;

a comparative device including a processor and configured to compare the electrical signal with a threshold voltage to detect an electrical signal greater than the threshold voltage; and a controller including a processor and configured to variably adjust the threshold voltage based on a result of comparing a number of receptions of an electrical signal detected through the comparative device with a first reference number of times;

wherein the first reference number of times is set according to a minimum time between which distinguishment of signals is possible for signal processing of the electrical signals detected through the comparative device; and wherein the controller is further configured to:

dynamically adjust the threshold voltage for each of a plurality of horizontal unit fields of view of the lidar when a horizontal field of view scanned by the lidar is changed;

increase the threshold voltage when the number of receptions of the electrical signal detected through the comparative device is more than the first reference number of times; and decrease the threshold voltage when the number of receptions of the electrical signal detected through the comparative device is less than the first reference number of times.

2. The lidar noise removal apparatus of claim 1, wherein the threshold voltage has an initial value which is set to a value greater than a maximum output of an electrical signal that the light receiving device is able to output.

3. The lidar noise removal apparatus of claim 1, wherein the controller is configured to variably adjust the threshold voltage determined for each of the plurality of horizontal unit fields of view of the lidar.

4. The lidar noise removal apparatus of claim 1, further comprising:

a light transmitting device configured to output a light signal, wherein the controller is configured to output the light signal through the light transmitting device when the threshold voltage is maintained.

5. The lidar noise removal apparatus of claim 4, wherein the controller is configured to:

control the light transmitting device to output the light signal a preset number of times, and detect a valid signal corresponding to a light signal which returns back by being reflected by a target by comparing electrical signals in rounds based on time information of electrical signals detected through the comparative device.

6. The lidar noise removal apparatus of claim 5, wherein the preset number of times the controller controls the light transmitting device to output the light signal is determined such that a remaining time, obtained by subtracting a time required to scan the horizontal unit field of view of the lidar from a total emission time, is greater than a time required to process an operation on the electrical signal.

7. The lidar noise removal apparatus of claim 5, wherein the controller is configured to determine, as the valid signal, an electrical signal in which a time corresponding to the electrical signal has a difference within a preset threshold time between rounds among the electrical signals detected through the comparative device.

8. The lidar noise removal apparatus of claim 7, wherein the threshold time is determined according to a preset error range for a distance from the lidar to the target.

9. The lidar noise removal apparatus of claim 1, wherein the controller is configured to variably adjust the threshold voltage based on a result of comparing the number of receptions of the electrical signal detected through the comparative device with a preset second reference number of times, when the lidar targets a short-range target.

10. A lidar noise removal apparatus comprising:

a light receiving device provided in a lidar to receive an electrical signal corresponding to an input light signal;

a comparative device configured to compare the electrical signal with a threshold voltage to detect an electrical signal greater than the threshold voltage; and a controller configured to monitor a level of a noise through an analog-digital converter (ADC) based on the electrical signal output from the light receiving device, and variably adjust the threshold voltage based on the monitored level of the noise;

wherein the first reference number of times is set according to a minimum time between which distinguishment of signals is possible for signal processing of the electrical signals detected through the comparative device; and wherein the controller is further configured to:

dynamically adjust the threshold voltage for each of a plurality of horizontal unit fields of view of the lidar when a horizontal field of view scanned by the lidar is changed;

increase the threshold voltage when the number of receptions of the electrical signal detected through the comparative device is more than the first reference number of times; and decrease the threshold voltage when the number of receptions of the electrical signal detected through the comparative device is less than the first reference number of times.

11. A lidar noise removal method comprising:

outputting, by a light receiving device provided in a lidar, an electrical signal corresponding to an input light signal;

comparing, by a comparative device, the electrical signal with a threshold voltage to detect an electrical signal greater than the threshold voltage;

variably adjusting, by a controller, the threshold voltage based on a result of comparing the number of receptions of the electrical signal detected through the comparative device with a preset first reference number of times;

wherein the first reference number of times is set according to a minimum time between which distinguishment of signals is possible for signal processing of the electrical signals detected through the comparative device;

dynamically adjusting, by the controller, the threshold voltage for each horizontal unit field of view of the lidar when the horizontal field of view scanned by the lidar is changed;

wherein the variably adjusting of the threshold voltage includes:

increasing, by the controller, the threshold voltage when the number of receptions of the electrical signal detected through the comparative device is more than the first reference number of times; and decreasing, by the controller the threshold voltage when the number of receptions of the electrical signal detected through the comparative device is less than the first reference number of times.

12. The lidar noise removal method of claim 11, wherein the threshold voltage has an initial value which is set to a value greater than a maximum output of an electrical signal that the light receiving device is able to output.

13. The lidar noise removal method of claim 11, wherein the variably adjusting of the threshold voltage includes variably adjusting, by the controller, the threshold voltage determined for each horizontal unit field of view of the lidar.

14. The lidar noise removal method of claim 11, further comprising:

controlling, by the controller, a light transmitting device to output a light signal a preset number of times; and detecting, by the controller, a valid signal corresponding to a light signal which returns back by being reflected by a target by comparing electrical signals in rounds based on time information of electrical signals detected through the comparative device.

15. The lidar noise removal method of claim 14, wherein the detecting of the valid signal corresponding to the light signal returning back by being reflected by the target, includes determining, by the controller, as a valid signal, an electrical signal in which a time corresponding to the electrical signal has a difference within a preset threshold time between rounds among the electrical signals detected through the comparative device.

16. The lidar noise removal method of claim 15, wherein the threshold time is determined according to a preset error range for a distance from the lidar to the target.

* * * * *